(12) United States Patent
Dodd

(10) Patent No.: US 9,696,953 B1
(45) Date of Patent: Jul. 4, 2017

(54) METHOD AND APPARATUS FOR DEVICE ACTIVITY MAPPING WITH DEVICE PLACEMENT

(71) Applicants: Kabushiki Kaisha Toshiba, Minato-ku (JP); Toshiba TEC Kabushiki Kaisha, Shinagawa-ku (JP)

(72) Inventor: Kevin Dodd, Irvine, CA (US)

(73) Assignees: Kabushiki Kaisha Toshiba, Minato-ku (JP); Toshiba TEC Kabushiki Kaisha, Shinagawa-ku (JP)

(*) Notice: Subject to any disclaimer, the term of this patent is extended or adjusted under 35 U.S.C. 154(b) by 0 days.

(21) Appl. No.: 14/981,403

(22) Filed: Dec. 28, 2015

(51) Int. Cl.
  *G06F 3/12* (2006.01)

(52) U.S. Cl.
  CPC .......... *G06F 3/1259* (2013.01); *G06F 3/1203* (2013.01); *G06F 3/1293* (2013.01)

(58) Field of Classification Search
  CPC combination set(s) only.
  See application file for complete search history.

(56) References Cited

U.S. PATENT DOCUMENTS

2012/0268765 A1* 10/2012 Yamade ............ G06F 17/5004
  358/1.13
2014/0176998 A1*  6/2014 Nakata .................. G06F 3/1206
  358/1.15

* cited by examiner

*Primary Examiner* — Henok A Shiferaw
(74) *Attorney, Agent, or Firm* — Ulmer & Berne LLP

(57) ABSTRACT

A system monitors usage of devices, such as document processing devices, relative to users, user's locations and device location. A display is generated that shows device utilization by various users allowing system administrators to gage efficiency and effectiveness of device placement. A graphical display of a premises layout, such as an office floorplan, includes indicia for user location and device location. Modification of size or color provides visual feedback for devices, device use pairing, and relative activity levels. Storage of historic usage allows for an administrator to move indicia relative to the layout screen, such as dragging and dropping of new devices, moving devices into new locations or removal of devices, to predict and display how user activity may be affected.

18 Claims, 6 Drawing Sheets

| User | Source Address | Printer 1 | | Printer 2 | |
| --- | --- | --- | --- | --- | --- |
| | | Number of Print Jobs | Distance for Roundtrip Retrieval (m) | Total Retrieval Distance (m) | Number of Print Jobs | Distance for Roundtrip Retrieval (m) | Total Retrieval Distance (m) |
| User 1 | ###.###.#.##### | 50 | 40 | 2000 | 2 | 10 | 20 |
| User 2 | ###.###.#.##### | 10 | 10 | 100 | 200 | 5 | 1000 |
| User 3 | ###.###.#.##### | 100 | 5 | 500 | 5 | 50 | 250 |

Fig. 6

METHOD AND APPARATUS FOR DEVICE ACTIVITY MAPPING WITH DEVICE PLACEMENT

TECHNICAL FIELD

This application relates generally to networked document processing devices. The application relates more particularly to management of document processing requests relayed to networked document processing devices.

BACKGROUND

Document processing devices include scanners, copiers, printers, plotters and fax machines. More recently, two or more of these functions are contained in a single device or unit, referred to as a multifunction peripheral (MFP) or multifunction device (MFD). As used herein, MFP includes any device having one or more document processing functions such as those noted above.

MFPs can be expensive, particularly when multiple devices are required for service. In addition to unit costs, MFPs may consume resources, such as paper, toner, ink or power. It is therefore advantageous to share one or more MFPs among multiple users, via workstations, notebook computers, tablets, smartphones, or any other suitable computing device. Interaction between users and MFPs can occur over any wired or wireless data infrastructure, such as local area networks (LANs), wide area networks (WANs), or point-to-point communication paths, such as universal serial bus (USB), infrared, Bluetooth, or near field communication (NFC). MPFs may be shared by multiple users on a premises. System administrators are tasked with obtaining, placing, servicing and stocking consumables for MFPs.

Some document devices may have different or better features than others. By way of example, some devices may have color capability, some may have features such as stapling, two-sided printing, or collating, and some may have fewer functions. Also, some devices may more proximate or convenient to users, particularly during those operations that require retrieval of a tangible product.

SUMMARY

In accordance with an example embodiment of the subject application, a system and method for a processor document processing device management includes a computer including a processor, a network interface and a data storage configured to store layout data representation of a layout of a premises, along with identification data for each of a plurality of computing devices and identification data for each of a plurality of document processing devices. The data storage further includes location data representative of a location of each of the computing devices relative to the layout and each of the document processing devices relative to the layout. The network interface receives activity data corresponding to a plurality of document processing operations between the computing devices and the document processing devices, and the processor generates usage data corresponding to document processing operations associatively with each requesting computing device and each requested document processing device. The processor generates data for display of relative location and quantity of document processing requests for each of the computing devices and each of the document processing devices relative to the layout.

In accordance with a further example embodiment of the subject application, the display includes an output corresponding to a delay between document processing request and subsequent retrieval from a document processing device.

In accordance with a further example embodiment of the subject application, positioning input from an associated user to alter a relative position of one or more computing devices relative to one or more document processing devices to generate a display corresponding to projected durations from the of a computing device or a document processing device relative to the layout. The processor calculates projected duration data in accordance with received positioning data and generates a corresponding display.

BRIEF DESCRIPTION OF THE DRAWINGS

Various embodiments will become better understood with regard to the following description, appended claims and accompanying drawings wherein:

FIG. 6 is an example embodiment of usage statistics.

DETAILED DESCRIPTION

Figure 1:
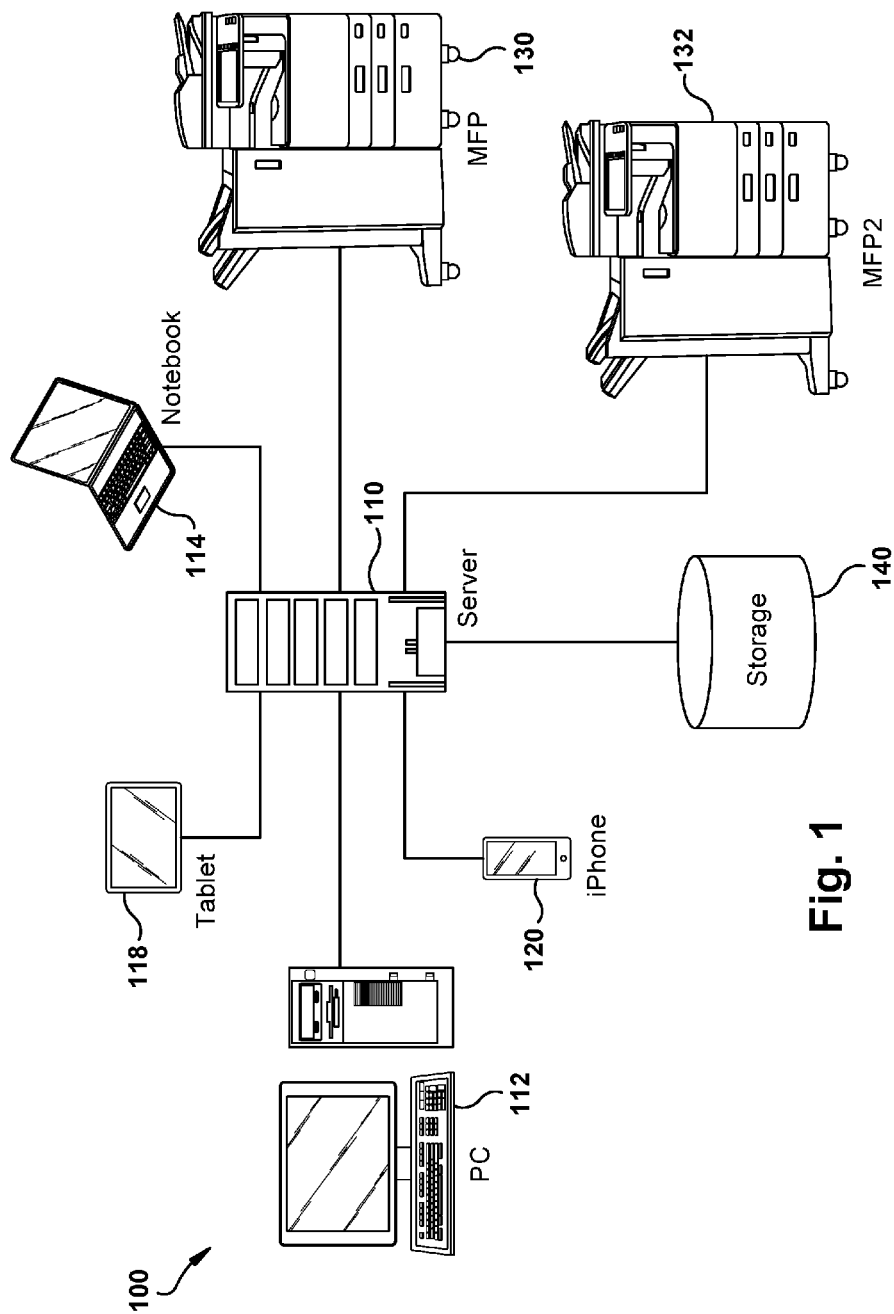
FIG. 1 is an example embodiment of a network for sharing of MFPs between computing devices.

When multiple users use multiple document processing devices on a premises, users will frequently desire to use a device that has the desired capabilities, and which is closer to them for retrieval purposes. Users may make device selections without fully appreciating potential benefits by selecting alternative devices, or they may not realize which devices are available to them. By way of example, a selected device may have the desired functionality and be reasonably proximate to a user, but device response may be slow due to servicing of a large number of user requests, or a device may be slower in operation. This can be attributed to factors such as different users using the devices in different ways. Users may have different trends in usage. For example, some users may regularly require color renderings, while others may generally require black-and-white spreadsheet printouts on large size paper.

Efficiency and ease of use are goals for shared document processing devices. It is difficult for a system administrator to visualize device usage or utilization. It also difficult to know or understand timing, such as the timing between when job requests are submitted, time until job completion, or time until a job is picked up from a device by a user.

Location of devices, such as user devices or MFPs can be ascertained. By way of example, an administrator may have a printout of a premises layout and mark a location of various printers, copiers, MFPs, or the like. Likewise, a location of stationary or relatively stationary user devices may be denoted. Such a graphical rendering may provide some feedback to an administrator relative to placement. An administrator may be able to visualize alternative locations relative to such user devices. However, this provides no actual information relative to considerations relative to actual usage, such as those noted above. Additionally, many devices in use today are mobile, such as with wireless computing devices including laptops, notebooks, tablets, smartphones, smart watches, augment reality devices, such as Google Glass, and the like.

Example embodiments herein facilitate capture, processing and dissemination of actual document processing device usage, including device usage initiated by various user devices within a network. Further examples include capture, processing and dissemination of device configurations or consumption of consumables. Consumables may include paper or other tangible output stock, toner, ink, electricity usage, network traffic, or the like.

Data relative to document processing device usage is suitably provided along with information as to a premises layout. Further example embodiments include information relative to placement and utilization of immobile or fixed devices. Still further example embodiments include information relative to current or historical placement and utilization by mobile devices. Such information is suitably obtained manual entry, location determination such as via GPS, access point contact, triangulation, manual data entry, or any other location-based services (LBS) positioning system or hybridized location system as will be appreciated by one of ordinary skill in the art and as further detailed further below.

Referring to FIG. 1, illustrated is an example embodiment of an output device sharing network 100. In the illustration, various digital devices are shown to be in data communication with one another, as well as with one or more servers. It is understood that any suitable data network may be implemented, such as a local area network (LAN), a wide area network (WAN), a piconet or the Internet, or a combination thereof. Suitable physical connections are suitably any wired or wireless connection, or combination thereof. By way of further example, suitable wireless data connections include Wi-Fi, wireless Ethernet, Bluetooth, near-field communication (NFC), wireless USB, cellular, optical, or the like. Suitable example wired data connections included Ethernet, Token Ring, POTS, USB, Firewire, optical fiber, T1, T3, or the like.

The network 100 includes one or more servers, illustrated by example server 110. Multiple data peripherals are in data communication, either persistently or periodically. Example devices include one or more personal computers, illustrated by PC 112, one or more notebook computers, illustrated by notebook computer 114, one or more tablet computers, illustrated by tablet computer 118, one or more smartphones, illustrated by smartphone 120, and one or more document processing devices, illustrated by MFPs 130 and 132. Also illustrate in the example embodiment is shared or networked data storage 140, suitably associated or distributed through any of the devices noted above.

Figure 2:
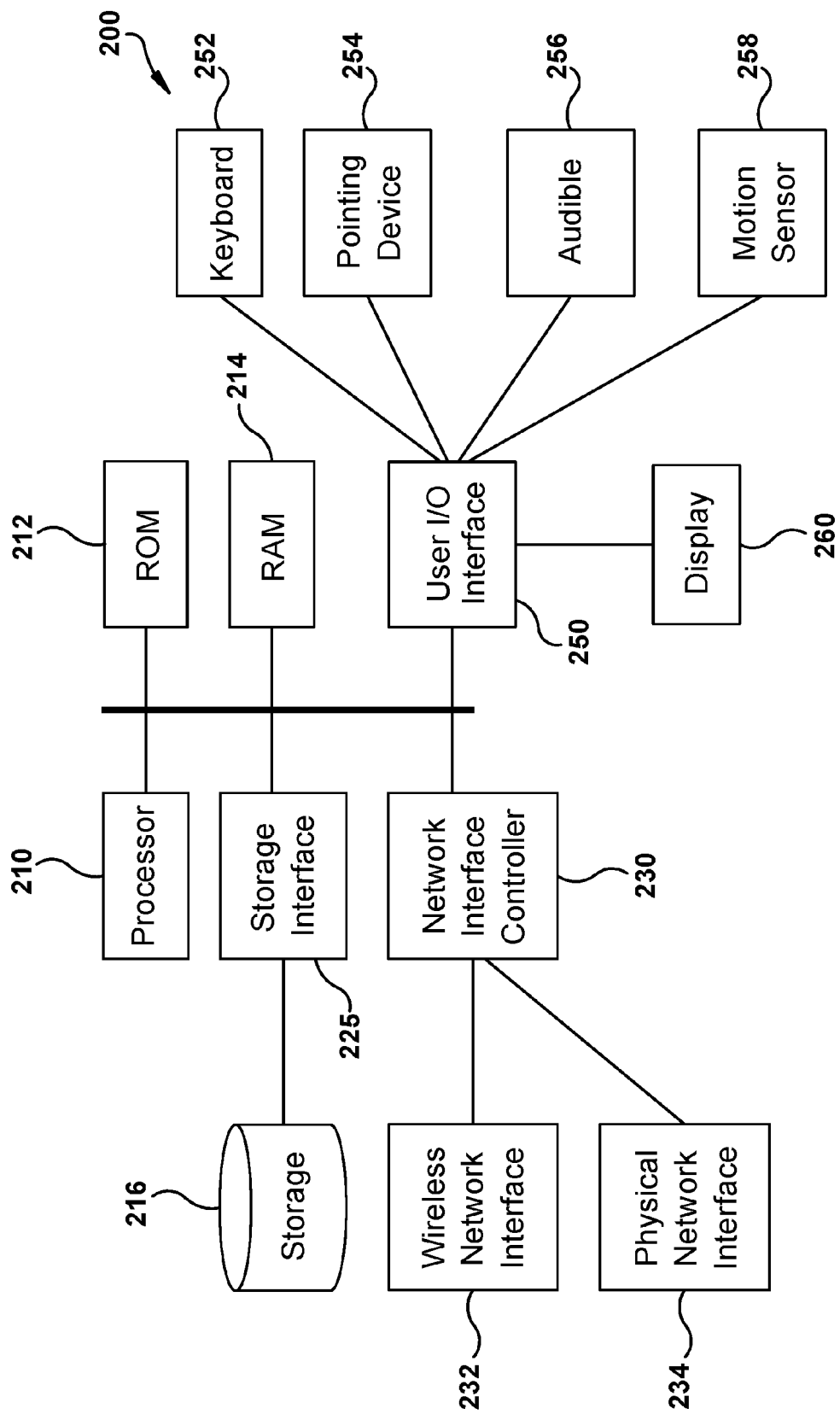
FIG. 2 is an example embodiment of an architecture of a suitable hardware platform for computing devices, MFPs or servers.

Turning now to FIG. 2, illustrated is example embodiment of a data processing device 200, suitably implemented in any or all of the devices noted above. Components of the data processing device 200 suitably include one or more processors, illustrated by processor 210, memory, suitably comprised of read-only memory 212 and random access memory 214, and bulk or other non-volatile storage 216, suitable connected via a storage interface 225. A network interface controller 230 suitably provides a gateway for data communication with other devices via wireless network interface 232 and physical network interface 234. A user input/output interface 250 suitably provides a gateway to devices such as keyboard 252, pointing device 254, audible recognition device 265, motion sensor 258 and display 260, suitably comprised of a touch-screen display. It will be understood that the computational platform to realize the system as detailed further below is suitably implemented on any or all of devices as described above.

Figure 3:
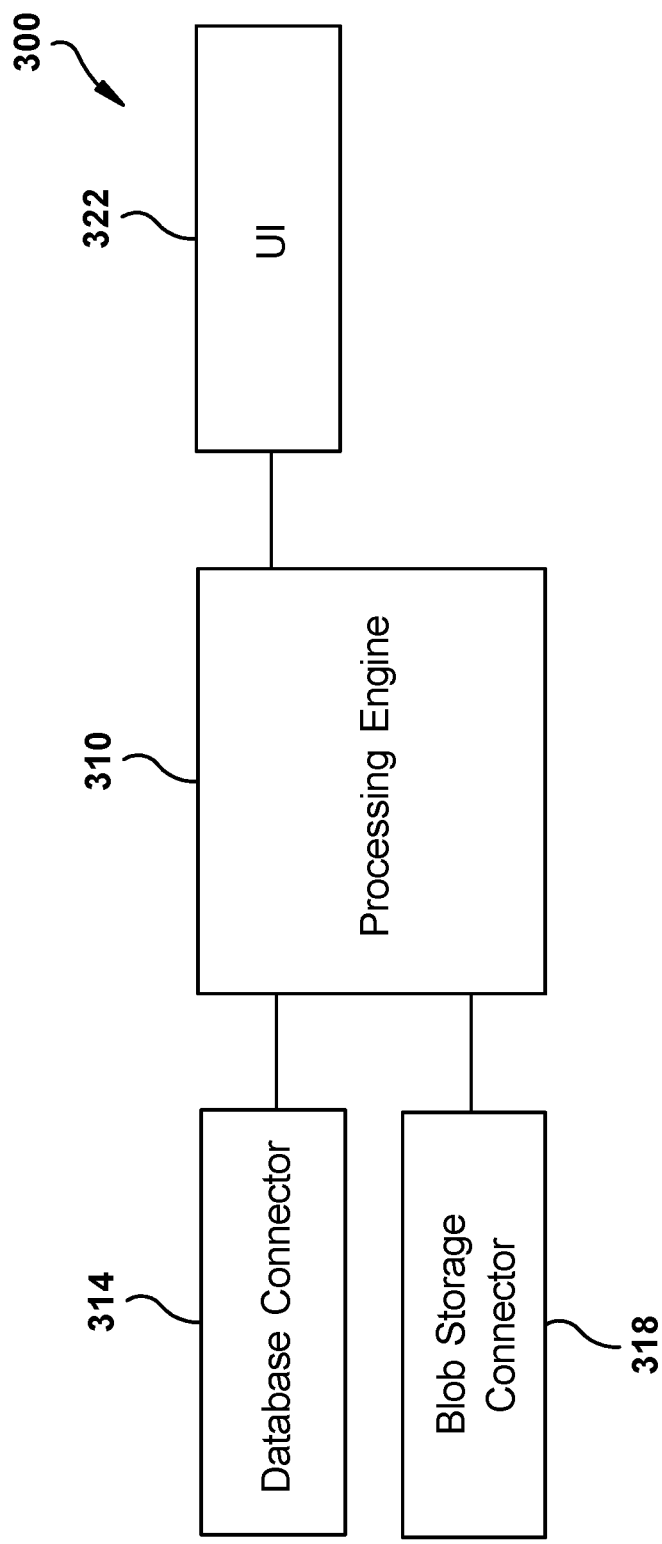
FIG. 3 is an example embodiment of a data collection and processing system.

Referring now to FIG. 3, illustrated is an example embodiment of a functional block diagram of a suitable processing engine 300 for use in connection with the resource monitoring and reporting system as further detailed below. Processing engine 310 works in concert with database connector 314, blob storage connector 318 and user interface 322 to accomplish computing, reporting and displaying resource usage in a visual manner.

Figure 4:
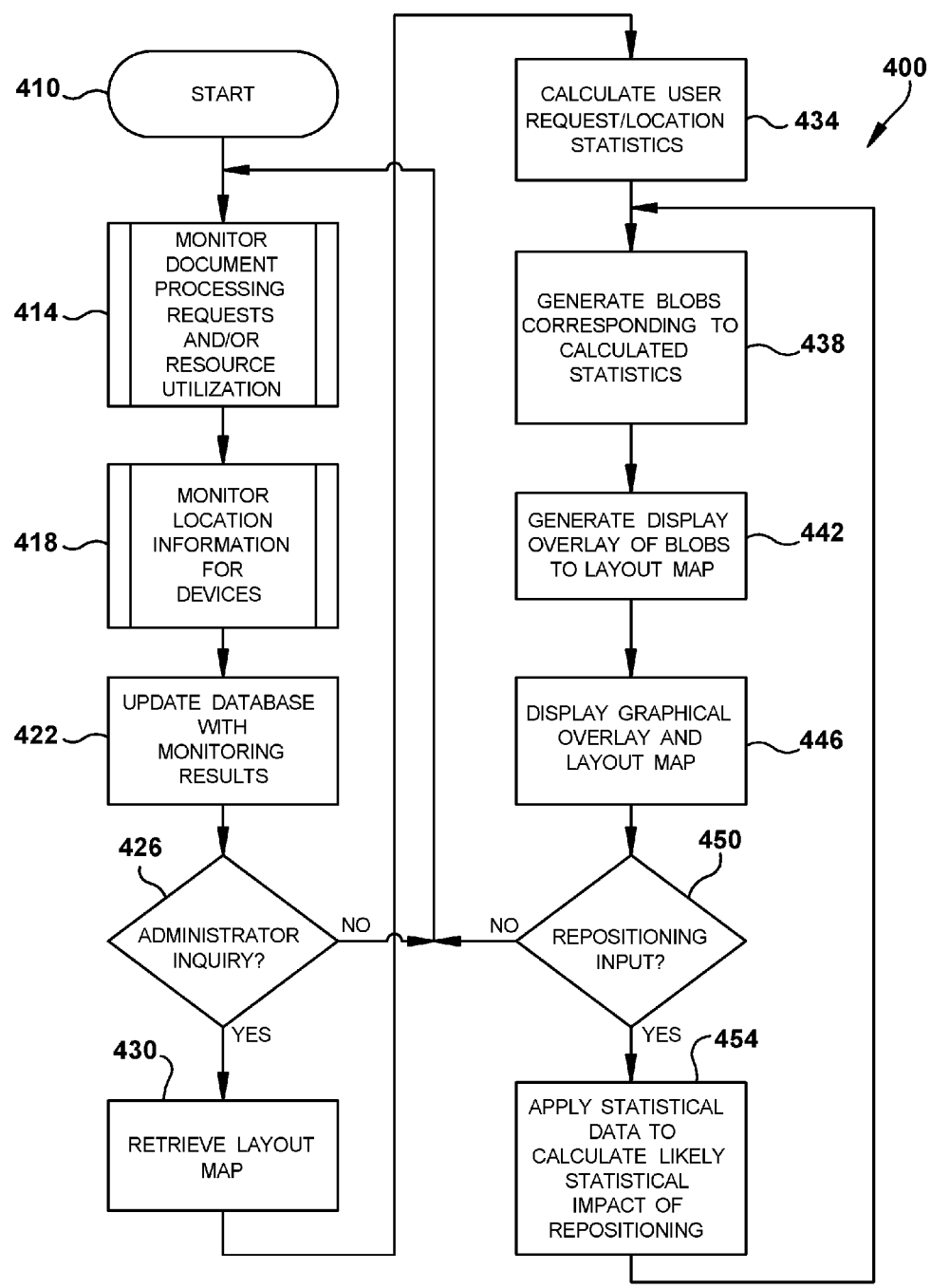
FIG. 4 is a flowchart of an example embodiment of a statistical monitoring and display system.

Turning now to FIG. 4, illustrated is a flowchart of an example embodiment of a statistical monitoring and display system 400. The process suitably commences at block 410, and proceeds to block 414 wherein data is obtained from monitored document processing requests, which requests identify a requesting device. Resource utilization, such as that noted above, is also suitably monitored. Requests may include print requests, which requests may be accompanied by a specified output medium, such a paper size or type which may be associated with a paper tray, color, black-and-white, number of copies, target device, finishing options such collating, multi-sided, tiled, stapled or hole-punched, as well as a number of copies requested, or the like.

Next, at block 418, data is obtained relative to physical location of networking device relative to a premises layout, such as a floor plan, a building plan or a multi-structure layout. This data is suitably stored for one or more layouts, and can be in a hierarchical fashion for large or complex layouts. In other example embodiments, location information may be obtained and utilized from geographically dispersed locations. Location information is suitably preloaded for a device into an associated database. An administrator may have a graphical rendering of a premises layout, and drag and drop an icon associated with a particular device at a location on that layout. Alternatively, location information may be obtained by automated location tools. Location information can be obtained, with varying degrees of coverage and accuracy, depending on the tools or combinations of tools implemented.

By way of further example, a GPS location has been adopted in many products. Today, GPS can be accurate to within four meters. However, GPS is constrained by its need to contact multiple, orbiting satellites. Thus, it is not optimal to ascertain a position of purely indoor devices. Positioning information of networked devices may be obtained by network topology. For example, a network device may be communicating via an identifiable, known location of wired network switches or series of switches. For wireless networking, location can be determined by knowing through which known location access point a wireless device is communicating. In cellular communications, it can be determined which cellular tower, with a known location, is in use by a device. Further refinement of cellular location may be obtained by identifying which sector around a tower is being contacted, and further refined as to distance from the tower by analyzing signal strength. Still further examples for obtaining location information include direction or signal strength relative to point-to-point wireless communications, such as Bluetooth, NFC, or the like.

With continuing reference to FIG. 4, document processing request data and location data is suitably captured in a database at block 422. A check is suitably made at block 426 to see if a request is made by a user, such as a system administrator, to view database content, as with a graphical display of devices, usage and locations as will be detailed further below. If no request is present, the process suitably returns to block 414 and continued monitoring of devices, location or usage is made and updated information capture into the database, and the process continues as described above.

If an inquiry is present at block 426, data corresponding to a visible rendering of a layout is obtained at block 430, and device request data and location data are obtained from the database and statistical data is computed at block 434. Next, in block 438, graphical rendering data is computed to generate a display of the statistical data. By way of example, document processing devices may each be assigned a blob or shape, such as an icon with a particular color on the layout, with document processing request devices being assigned a blob or shape, which can also be an icon, having color corresponding to a color of a document processing device being utilized. In a further example embodiment, an appearance or color of a shape is altered according to device usage or device request.

In an example embodiment, devices sending document requests are represented by a circle, the diameter of which is related to the number of document processing requests being sent by that device. A similar alteration is suitably made for depictions corresponding to document processing devices.

With the display data calculated, a visual rendering of devices relative to the layout map is made at block 442 and the graphical overlay and the layout map are displayed together to the user at block 446. In certain situations an administrator may wish to predict how moving devices around might affect usage. A test is made at block 450 to determine if this is desired. If not, the process suitably returns to block 414, and the process continues as before. If so, the administrator suitably drags and drops one or more devices into a different location on the premises layout. Data reflective to such change in location is applied relative to the statistical information at block 454, and the process returns to block 438 for generation of a display evidencing a likely result from this restructuring. Further viewing and manipulation are suitably accomplished again at blocks 446 and 450 respectively. If no additional repositioning is made, the process suitably returns to block 414, and the process recommences. It will be appreciated that the process need not run perpetually, and may be initiated periodically or situationally and can be terminated at any point.

Figure 5:
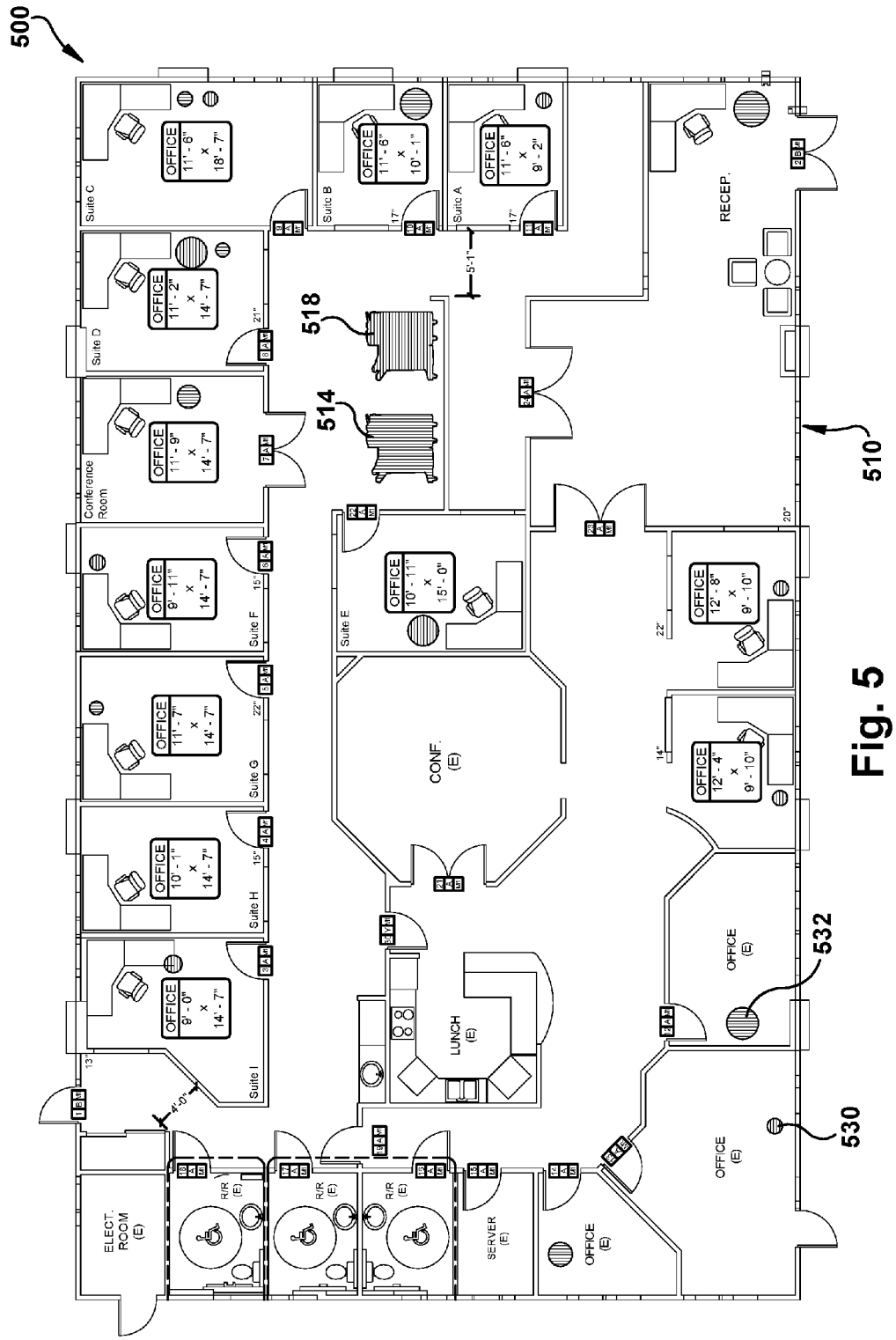
FIG. 5 is an example embodiment of a graphical layout of a premises.

Referring now to FIG. 5, illustrated is an example embodiment if display of a usage and location layout 500 evidencing the depictions such as described above. A layout map 510 is displayed along with blobs, shapes or icons including multifunction peripherals 514 and 518, along with blobs, shapes or icons for document processing requesting devices, indicated by circles in the example illustration. Further illustrated in the example is a large circle 532, representative of a larger volume of operations relative to small circle 530. Circle size is suitably proportional to a number of requested document processing operations.

Turning now to FIG. 6, illustrated is an example embodiment of device data suitably captured to facilitate the analysis and display detailed above. Representative data is illustrated as a table for ease of understanding. In the example, data collected includes a source indicator, such as an IP source address, a number of print jobs associated with that address, a distance relative to the source and target devices and a retrieval distance corresponding to how far a person must walk to a device to pick up their printout. This information is suitably obtained from two or more printers, such as the MFPs in the example embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A device comprising:
a data storage configured to store layout data representation of a layout of an associated premises,
the data storage configured to store identification data for each of a plurality of computing devices,
the data storage configured to store identification data for each of a plurality of document processing devices,
the data storage configured to store location data representative of a location of each of the computing devices relative to the layout data, and
the data storage configured to store location data representative of a location of each of the document processing devices relative to the layout data;
a network interface configured to receive activity data corresponding to a plurality of document processing operations between the computing devices and the document processing devices;
the network interface further configured to receive request time data representative of times associated with document processing requests corresponding to requested document processing operations;
the network interface further configured to receive retrieval time data representative of a time associated with user retrieval of a tangible document associated with a document processing operation from a document processing device associated therewith;
a processor configured to generate usage data corresponding to document processing operations associatively with each requesting computing device and each requested document processing device;
the processor further configured to generate duration data corresponding to a duration between each document processing request and associated document retrieval;
an output configured to display the output data representative of a display of relative location and quantity of document processing requests for each of the computing devices and each of the document processing devices relative to the layout; and
the output further configured to display the output data representative of the duration data.

2. The device of claim 1 further comprising:
a display configured to generate a graphical representation of the output data, the graphical representation including a rendering of indicators corresponding to a location of the computing devices and document processing devices within the layout.

3. The device of claim 2 wherein an appearance of the indicators is altered in accordance with document processing operation volume associated therewith.

4. The device of claim 3 wherein at least one of size or color of each indicator is altered in accordance with document processing operation volume associated therewith.

5. The device of claim 2 wherein the appearance of the indicators is altered in accordance with duration data.

6. The device of claim 2, further comprising:
an input configured to receive, from an associated user, positioning data relative to modification of a location of a computing device or a document processing device relative to the layout,
wherein the processor is further configured to calculate projected duration data in accordance with received positioning data, and
wherein the display is further configured generate a display corresponding to the projected duration data.

7. A method comprising:
storing, in a memory, layout data representation of a layout of an associated premises;
storing, in the memory, identification data for each of a plurality of computing devices;
storing, in the memory, identification data for each of a plurality of document processing devices;
storing, in the memory, location data representative of a location of each of the computing devices relative to the layout data;
storing, in the memory, location data representative of a location of each of the document processing devices relative to the layout data;
receiving activity data corresponding to a plurality of document processing operations between the computing devices and the document processing devices;
receiving a request time data representative of times associated with document processing requests corresponding to requested document processing operations;
receiving retrieval time data representative of a time associated with user retrieval of a tangible document associated with a document processing operation from a document processing device associated therewith;
calculating, via a processor, usage data corresponding to a document processing operations associatively with each requesting computing device and each requested document processing device;
calculating, via the processor, duration data corresponding to a duration between each document processing request and associated document retrieval;
generating a display of relative location and quantity of document processing requests for each of the computing devices and each of the document processing devices relative to the layout; and
outputting data representative of the duration data.

8. The method of claim 7 further comprising:
generating a graphical representation of the output data, the graphical representation including a rendering of indicators corresponding to a location of the computing devices and document processing devices within the layout.

9. The method of claim 8 further comprising:
altering an appearance of the indicators in accordance with document processing operation volume associated therewith.

10. The method of claim 9 further comprising:
altering least one of size or color of each indicator in accordance with document processing operation volume associated therewith.

11. The method of claim 8 further comprising:
altering the appearance of the indicators in accordance with duration data.

12. The method of claim 8 further comprising:
receiving, from an associated user, positioning data relative to modification of a location of a computing device or a document processing device relative to the layout;
calculating, via the processor, projected duration data in accordance with received positioning data; and
generating a display corresponding to the projected duration data.

13. A system comprising:
a plurality of document processing devices in data communication with a data network, configured to receive document processing requests from one or more user computing devices;
a plurality of user computing devices in data communication with the data network configured to output a document processing request to one or more document processing devices via the data network; and
a server, in data communication with the data network, configured to receive data corresponding to document processing requests from the data network,
the server configured to store layout data corresponding to a layout of a workplace,
the server configured to store device location data corresponding to a location of each of the plurality of document processing and user computing devices relative to the layout,
the server configured to receive job data corresponding to a retrieval, by an associated user, of a tangible document output, corresponding to a job request, from one or more document processing devices,
the server configured to receive request time data representative of time associated with the job request,
the server configured to receive retrieval time data representative of a time associated with user retrieval of a tangible document associated with the job request,
the server configured to calculate a duration between each document processing request and retrieval of a corresponding, tangible document output,
the server configured to generate a graphical display of the office layout contemporaneously with indicia of each of a position of the user computing devices and each of the document processing devices within the layout, and
the server configured to generate a display of each calculated duration.

14. The system of claim 13 wherein indicia include a graphical element having an appearance corresponding to an associated duration.

15. The system of claim 13 wherein indicia include a graphical element having an appearance corresponding to a device location.

16. The system of claim 13 wherein indicia include a graphical element having an appearance corresponding to a source and destination of a document processing operation.

17. The system of claim 13 wherein the server is further configured to receive placement data from an associated user, the placement data corresponding to a relocation of at least one of the document processing devices relative to at least one of the user computing devices, and
wherein the server is further configured to calculate a projected duration corresponding to the placement data.

18. The system of 17 wherein the server is further configured to receive placement data from an associated user, the placement data corresponding to a relocation of at least one of the document processing devices relative to at least one of the user computing devices,
wherein the server is further configured to calculate a projected duration corresponding to the placement data;

wherein the indicia include graphical elements corresponding to one or more of duration, document processing device location or source and destination of a document processing operation, and
wherein the indicia is altered in accordance with the projected duration.

\* \* \* \* \*